SEQUENTIAL CONTENT ADDRESSABLE MEMORY

Filed June 20, 1966 2 Sheets-Sheet 1

INVENTORS
RALPH J. KOERNER
ALFRED D. SCARBROUGH
BY Arthur Freilich
ATTORNEY

INVENTORS
RALPH J. KOERNER
ALFRED D. SCARBROUGH
BY Arthur Freilich
ATTORNEY 3,500,340
Patented Mar. 10, 1970

3,500,340

SEQUENTIAL CONTENT ADDRESSABLE MEMORY

Ralph J. Koerner, Canoga Park, and Alfred D. Scarbrough, Northridge, Calif., assignors to The Bunker-Ramo Corporation, Stamford, Conn., a corporation of Delaware Filed June 20, 1966, Ser. No. 558,816
Int. Cl. G11b *9/00, 13/00, 5/00*
U.S. Cl. 340—173 8 Claims

ABSTRACT OF THE DISCLOSURE

A content addressable memory including a plurality of memory elements arranged in a matrix of rows and columns, each row storing a different multibit data word. A plurality of word lines are provided, each coupled to the elements of a different matrix row. A timing device is provided to interrogate the columns in sequence to thus sequentially develop bit indicating signals on the word lines indicative of the states of the memory elements. A plurality of comparison device means are provided, each coupled to a different one of the word lines. The comparison device means are all sequentially responsive to the search word bits for operating on the indicating signals successively developed on the word lines to in turn develop mismatch output signals, each indicating a mismatch between a search word bit and the corresponding data word bit. Each of the mismatch output signals includes an excursion of a first polarity. A plurality of sense elements are also provided, each coupled to a different one of the word lines and responsive to signal excursions of a first polarity.

This invention relates generally to digital memories and more particularly to improvements in content addressable memories.

U.S. Patent No. 3,031,650 discloses some basic content addressable memory implementations and discusses the characteristics which distinguish such memories from conventional digital memories. Briefly, the significant distinguishing characteristic is that each word location in a content addressable memory is not uniquely identified by an address as in conventional digital memories but instead content addressable memory locations are selected on the basis of information stored therein; i.e., the contents thereof. Hence, the name content addressable memory.

As a result of selecting locations on the basis of stored information, memory search times can be considerably reduced at the cost of some additional hardware. That is, in situations where it is desired to select those locations, out of N locations in memory, storing data words matching a search word, information identifying those locations can be derived in one memory access period instead of the N such periods required by conventional digital memories. More particularly, whereas it is necessary in a conventional digital memory to sequentially access the contents of each location and compare each accessed data word with a search word, comparison of the search word with all of the data words can be simultaneously effected in a content addressable memory.

Essentially, most content addressable memory systems operate by causing one or more signals representative of a search word bit to be applied simultaneously to all memory elements storing bits of corresponding significance. Some type of logic means is provided in the memory, such means being operable to generate signals to indicate whether the bits stored in the various memory elements are the same as or different from the corresponding search bit being sought. All elements of a single memory word location are coupled to a common word line and by sensing resultant signals appearing on the word line, a determination is made as to whether or not the data word stored in the memory location associated with the word line matches or mismatches the search word.

Whereas the content addressable memory embodiment disclosed in the aforementioned U.S. Patent No. 3,031,650 performs a search which considers all stored bits in parallel, as well as all stored words, U.S. patent application Ser. No. 269,009, now U.S. Patent No. 3,297,995, filed Mar. 29, 1963 by Ralph J. Koerner and Alfred D. Scarbrough and assigned to the same assignee as the present application, discloses a content addressable memory embodiment which causes the bits of stored data words to be considered serially or sequentially, while the words are still considered in a parallel fashion. Sequential operation permits simplifications in the sense circuitry as a consequence of an improved signal to noise ratio. Sequential operation also permits search criteria other than "exact match" to be employed.

Briefly, the present invention is directed to sequential content addressable memory systems which employ a plurality of comparison devices, each coupled to a different word line, which devices are all responsive to successive bits of a search word to enable the occurrence of a mismatch signal on a word line to be recognized.

More particularly, in a first embodiment of the present invention, the comparison device coupled to each word line comprises a gate which is enabled in response to a first strobe pulse if the search bit defines a first state or a second strobe pulse if the search bit defines a second state. In accordance with a second embodiment of the invention, the device is comprised of first and second memory elements always defining opposite states. Dependent on the state of the search bit, either the first or second memory element is interrogated to develop signals on the word lines which either reinforce or cancel the signals simultaneously developed on the word line by the interrogated data word element.

The novel features that are considered characteristic of this invention are set forth with particularity in the appended claims. The invention will best be understood from the following description when read in connection with the accompanying drawings, in which:

Figures 1, 2:
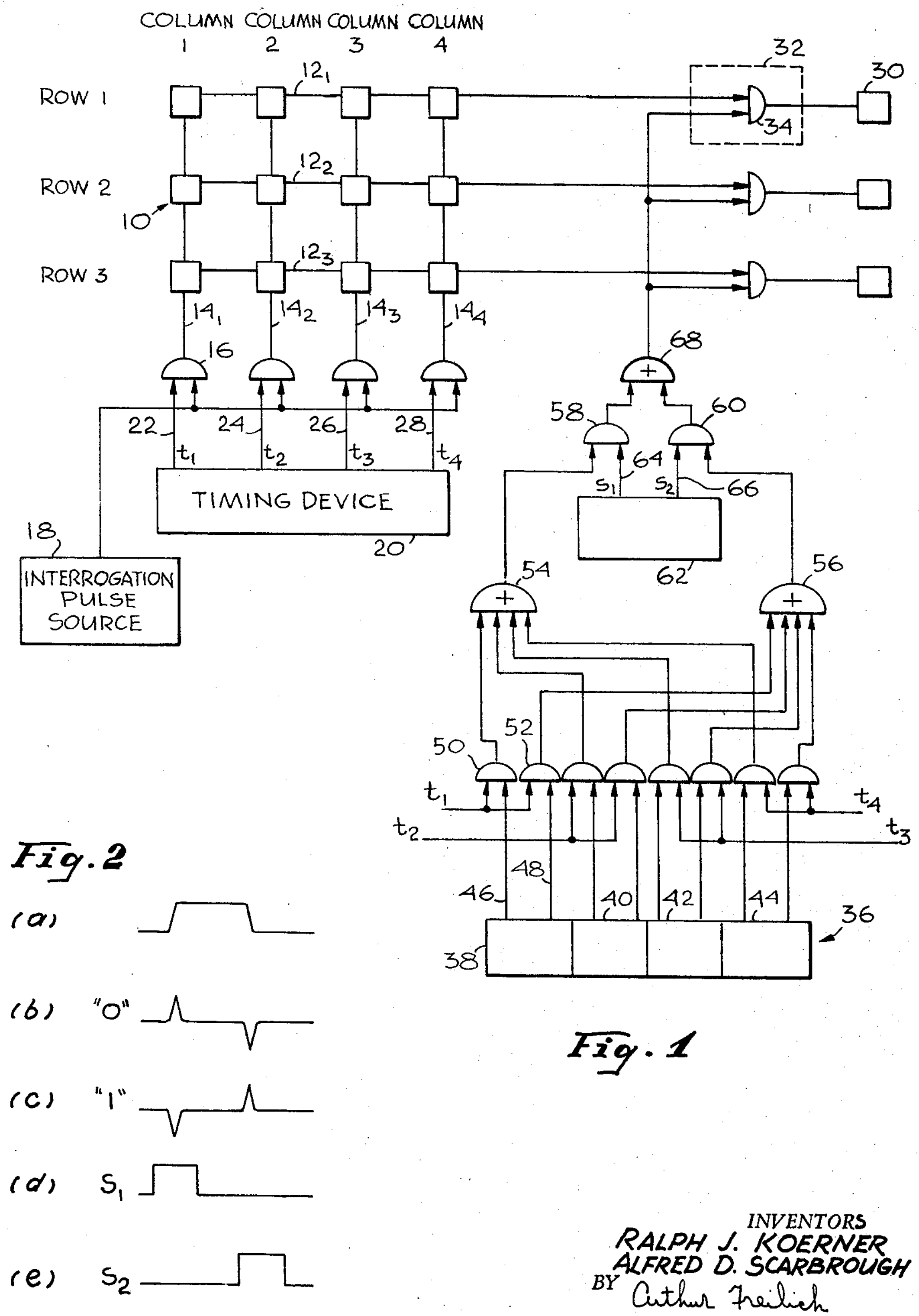
FIG. 1 is a block diagram of a first embodiment of the invention.
FIG. 2 is a waveform diagram illustrating the operation of the embodiment of FIG. 1.

Attention is now called to FIG. 1 of the drawings which illustrates a first embodiment of a content addressable memory system constructed in accordance with the teachings of the present invention. The embodiment of FIG. 1 is comprised of a matrix of memory elements 10 arranged in rows and columns. Although the matrix illustrated in FIG. 1 is comprised of three rows and four columns, it should be understood that any size matrix can be employed in accordance with the concepts of the present invention.

All of the memory elements 10 of the same row are coupled to a common word line 12. Thus, the memory elements 10 of row 1 are coupled to word line $12_1$, and the memory elements 10 of rows 2 and 3 respectively are coupled to word lines $12_2$ and $12_3$. Similarly, the memory elements 10 of each matrix column are coupled to a common digit line 14. Thus, the memory elements 10 of columns 1, 2, 3, and 4 of the matrix respectively are coupled to digit lines $14_1$, $14_2$, $14_3$, and $14_4$.

Each digit line 14 is connected to the output of a different AND gate 16. The output of an interrogation pulse source 18 is connected to the input of all of the AND gates 16. A timing device 20 is provided which sequentially defines time periods or time slots $t_1$–$t_4$ and successively applies enabling signals to its output lines 22, 24, 26, and 28 to enable a different gate 16 during each time slot.

Each word line 12 is coupled to a different binary sense element 30 by a coupling or comparison device 32. In the embodiment of FIG. 1, the device 32 includes an AND gate 34. The output of each AND gate 34 is connected to a different one of the sense elements 30. Each word line 12 is connected to the input of a different AND gate 34. As will become more apparent hereinafter, the AND gates 34 are controlled in accordance with the states of the search word bits stored in the stages of a search register 36.

More particularly, a search register 36 is provided having the same number of stages (herein, four) as there are columns in the matrix. Thus, the register 36 is comprised of stages 38, 40, 42, and 44. Each of the stages of the search register 36 is capable of defining either a "1" state or a "0" state. Each of the search register stages is provided with first and second output terminals 46 and 48 such that when the stage stores a "1," a true signal is provided on terminal 46, and when the stage stores a "0," a true signal is provided on terminal 48. The terminals 46 and 48 of each search register stage 36 are coupled to the input of different ones of a pair of AND gates 50 and 52. All of the gates 50 and 52 are controlled by the timing device 20. For example, the gates 50 and 52 coupled to search register stage 38 are enabled during time slot $t_1$ by output line 22. The gates 50 and 52 associated with search register stages 40, 42, and 44 respectively are enabled during time slots $t_2$, $t_3$, and $t_4$. The outputs of all of the gates 50 are connected to the inputs of an OR gate 54. Similarly, the outputs of all of the gates 52 are connected to the inputs of OR gate 56. The output of gate 54 is connected to the input of gate 58 and the output of gate 56 is connected to the input of gate 60.

A multi-pulser 62 is provided which operates to apply spaced strobing pulses $S_1$, $S_2$ to its output terminals 64 and 66 respectively. The output terminals 64 and 66 are respectively connected to gates 58 and 60. The outputs of gates 58 and 60 are connected to the inputs of OR gate 68. The output of OR gate 68 is connected to the input of all of the gates 34.

It is well known in the art that content addressable memory systems are useful for enabling a search word to be simultaneously compared with each of a plurality of stored data words. The embodiment of the invention shown in FIG. 1 is useful for comparing a four bit search word stored in register 36 with four bit data words stored in the rows or word locations of the memory matrix. As should be apparent from what has been said thus far, the bits of the search word are considered in sequence with each being simultaneously compared with all of the corresponding bits in the stored data words. Although content addressable memories can be used to compare search and data words in accordance with many different criteria (as, for example, is shown in the aforecited patent application), for the sake of simplicity herein, the operation of the embodiment of FIG. 1 will be explained only with reference to an "exact match" search criterion.

Although various types of memory elements 10 can be employed in accordance with the teachings of the invention, a typical such element comprises a multiaperture magnetic core commonly called a Biax. Such an element exhibits the characteristics shown in FIG. 2. That is, when interrogated by an interrogation pulse as shown in line *a*, the element will respond by providing a pair of opposite polarity pulses on a word line coupled thereto as shown in lines *b* and *c*. Thus, if an element 10 stores a "0," when it is interrogated by a pulse as shown in line *a*, it will provide an initial positive going pulse substantially coincident with the leading edge of the interrogation pulse and subsequently a negative going pulse substantially coincident with the trailing edge of the interrogation pulse. Line *c* illustrates that if the element stores a "1," then when interrogated, it will initially produce a negative going pulse on the word line coupled thereto followed by a positive going pulse substantially coincident with the trailing edge of the interrogation pulse.

In accordance with the present invention, the gates 34 are strobed by the output of gate 68 in order to pass mismatch signals to the sense elements 30 of only one polarity (herein assumed to be positive). Prior to initiating a search, all of the sense elements 30 are switched to a match state. When a stored data word bit is compared with and mismatches a search bit, a positive pulse developed on the data word bit word line is applied to the sense element coupled thereto to switch it to a mismatch state. More particularly, assume the first stage 38 of the search register 36 stores a "1." As a consequence, the gate 50 will be enabled during time slot $t_1$. Concurrently, the memory elements 10 of column 1 of the matrix will be interrogated. If an interrogated memory element stores a "1," then coincident with strobe pulse $S_1$, it will provide a negative going pulse on its word line. On the other hand, if a memory element stores a "0," so that its state does not match the assumed state of the corresponding search bit, then coincident with strobe pulse $S_1$, it will provide a positive going pulse to the sense elements.

Assume that stage 40 of search register 36 stores a "0." As a consequence, during time slot $t_2$, the gate 52 coupled to stage 40 will be enabled to thus enable gates 56 and 60 to enable the gates 34 coincident with the development of strobing pulse $S_2$. As a consequence, the memory elements of column 2 of the matrix storing a "0," will pass a negative going pulse to the sense element 30, but interrogated elements storing a "1" will, of course, pass a positive going pulse. As noted, the sense elements 30 respond to positive pulses by switching from a match to a mismatch state.

Accordingly, it should now be apparent that during each of the time slots, a different one of the search word bits stored in register 36 is compared with all of the correspondingly significant data word bits stored in the memory matrix. After all the time slots have been defined, thus, of course, meaning that all of the search bits have been compared with the correspondingly significant data word bits, those sense elements 30 remaining in a match state will, of course, indicate those data words stored in the memory which match the search word.

Figure 3:
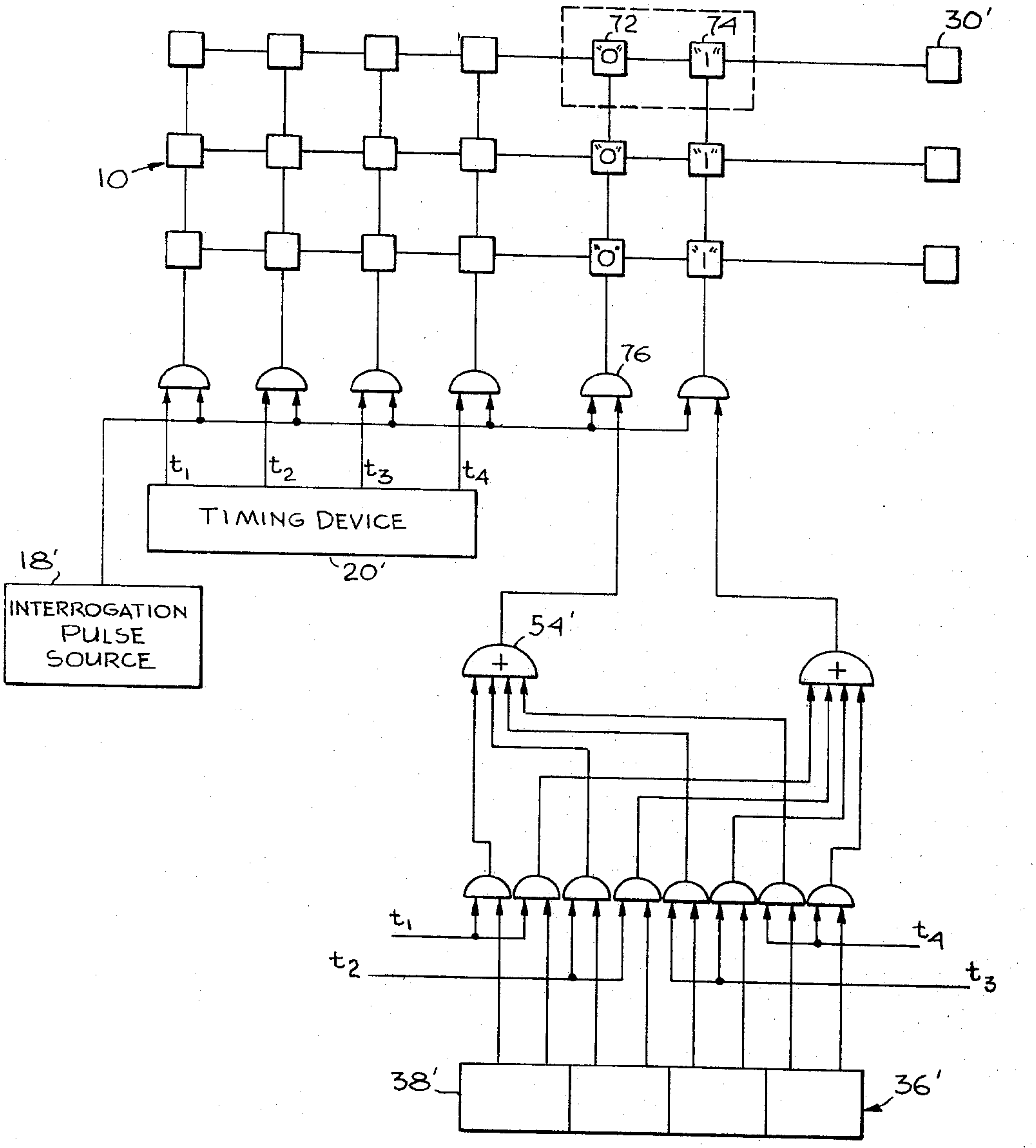
FIG. 3 is a block diagram of a second embodiment of the invention.

Attention is now called to FIG. 3 which illustrates an alternative embodiment of a content addressable memory system in accordance with the present invention. The embodiment of FIG. 3 is very similar to the embodiment of FIG. 1 except, however, that instead of utilizing strobing signals spaced in time to determine mismatch signals, a cancellation technique is employed. Because of the similarity, elements in FIG. 3 which are the same as elements in FIG. 1 will be given the same designating numeral which, however, will be primed.

More particularly, in FIG. 3, in lieu of utilizing the gate 34 employed in FIG. 1, first and second dedicated memory elements 72 and 74 are coupled to each of the word lines. All of the elements 72 permanently define a "0" state and all of the elements 74 permanently define a "1" state. The memory elements 10 of the matrix are interrogated in the same manner in the embodiment of FIG. 3 as they were in the embodiment of FIG. 1. In the embodiment of FIG. 3, during each time slot, either all of the elements 72, or all of the elements 74, are interrogated, dependent upon the state of the search word bit active during that time slot. Thus, again assume that the first stage 38' of the search register 36' stores a "1." As a consequence, during time slot $t_1$, OR gate 54' will be enabled to thus enable AND gate 76 to thereby interrogate all of the memory elements 72. As a consequence, each of the elements 72 will provide an output signal, as shown in line *b* of FIG. 2, on the word line coupled thereto. These output signals provided by elements 72 will either reinforce or cancel the signals simultaneously provided by the interrogated memory elements. Thus, if during time slot $t_1$ a memory element in column 1 of the matrix stores a "1," then the signals appearing on the word line associated therewith will be cancelled. Therefore, the sense element 30' coupled to that word line will remain in a match state indicating that the corresponding element in column 1 of the matrix matches the bit stored in stage 38' of the search register 36'. If on the other hand a memory element in matrix column 1 stores a "0," then the signal provided on the word line thereby will reinforce the signal provided by an interrogated element 72 to thereby switch the associated sense element to a mismatch state.

From the foregoing, it should be appreciated that two embodiments of a content addressable memory system in accordance with the invention have been disclosed herein for searching to determine which of a plurality of stored data words matches a search word. It will be appreciated that no attempt has been made herein to discuss in detail the many applications of content addressable memories or the many different criteria which can be employed in conducting a search. The aforecited U.S. patent application discusses many of these aspects of content addressable memories and it is pointed out that various applications and other considerations mentioned therein apply also to the teachings of the present invention. It is also reiterated that various memory elements 10 can be employed in accordance with the present invention and the multiaperture magnetic core or Biax mentioned represents only one of several different elements which can be employed. Many elements other than multiaperture magnetic cores exhibit substantially the same characteristics as are illustrated in FIG. 2. For example only, thin film elements and other elements which operate on the principle of domain rotation exhibit characteristics as shown in FIG. 2. It is also pointed out that the timing device for defining time slots is illustrative only and it should be appreciated that various arrangements can be employed to sequentially energize the digit lines. For example, the digit lines could be interconnected by a delay means so that if a pulse is applied to the first digit line, it will propogate through the others.

The embodiments of the invention in which an exclusive property or privilege is claimed are defined as follows:

1. A content addressable memory system for simultaneously comparing a multibit search word with a plurality of multibit data words, said system comprising:

a matrix of memory elements arranged in rows and columns, each row of elements storing a different one of said data words;

a plurality of word lines each coupled to all of the elements of a different one of said rows;

means for sequentially interrogating on a column by column basis all of the elements in each column to develop successive sets of bit indicating signals on said word lines, each signal of a given set indicating the state of a different one of the interrogated memory elements;

a multistage search word register, each stage storing a different bit of said search word;

a plurality of comparison device means each coupled to a different one of said word lines;

timing means for successively coupling all of said comparison device means to said search word register stages in sequence, each of said comparison device means being responsive to the successive bits of said search word for operating on the bit indicating signals successively developed on the word line coupled thereto for developing mismatch output signals indicating a mismatch between a search word bit and the corresponding data word bit, each of said mismatch output signals including an excursion of a first polarity; and a plurality of sense elements, each coupled to a different one of said word lines, and responsive to signal excursions of a first polarity.

2. The memory system of claim 1 wherein each of said comparison device means includes first and second memory elements defining opposite states.

3. The memory system of claim 2 including means for interrogating, coincident with the interrogation of each of said columns, either said first or second memory elements dependent upon the search word bit corresponding to the interrogated column whereby the indicating signal on each of said word lines will be either cancelled or reinforced.

4. The memory system of claim 1 wherein each of said indicating signals is comprised of an initial portion and a subsequent portion.

5. The memory system of claim 4 wherein each of said comparison device means comprises a gate.

6. The memory system of claim 5 including means for enabling said gates during the interrogation of each of said columns either coincident with the initial or subsequent portions of said indicating signals.

7. The memory system of claim 4 wherein each of said indicating signals is characterized either by an initial positive going portion and a subsequent negative going portion or an initial negative going portion and a subsequent positive going portion.

8. The memory system of claim 7 wherein each of said comparison device means comprises a gate; and means for enabling said gates during the interrogation of each of said columns either coincident with the initial or subsequent portions of said indicating signals.

References Cited

UNITED STATES PATENTS 3,339,181 8/1967 Singleton ---------- 340—173

TERRELL W. FEARS, Primary Examiner

U.S. Cl. X.R.

340—172.5, 174